Figure 1A:
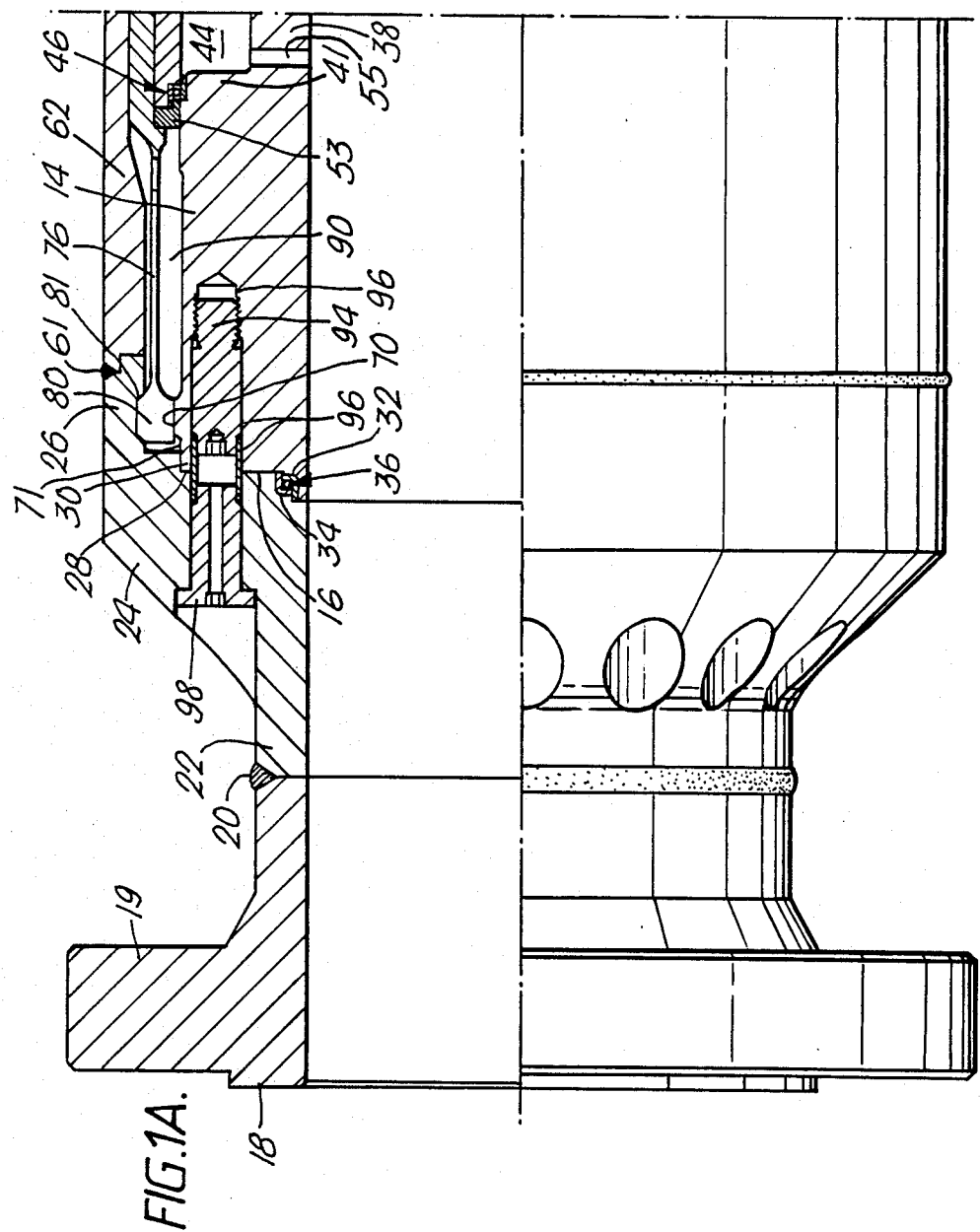

United States Patent [19]

Ratcliffe

[11] Patent Number: 4,826,214

[45] Date of Patent: May 2, 1989

[54] PIPELINE SAFETY JOINT

[75] Inventor: Harold Ratcliffe, Kilmacolm, Scotland

[73] Assignee: James Howden & Company Ltd., Glasgow, Scotland

[21] Appl. No.: 82,429

[22] Filed: Aug. 6, 1987

[30] Foreign Application Priority Data

Aug. 8, 1986 [GB] United Kingdom ............... 8619354

[51] Int. Cl.$^4$ .............................................. F16L 35/00
[52] U.S. Cl. ......................................... 285/2; 285/18;
285/96; 285/900
[58] Field of Search ....................... 285/2, 96, 94, 101, 285/100, 900, 18

[56] References Cited

U.S. PATENT DOCUMENTS

| | | | |
|---|---|---|---|
| 3,057,646 | 10/1962 | Brumagim | 285/96 X |
| 4,059,288 | 11/1977 | Mohr | 285/2 |
| 4,348,039 | 9/1982 | Miller | 285/900 X |
| 4,688,827 | 8/1987 | Bassett | 285/2 |

*Primary Examiner*—Thomas F. Callaghan
*Attorney, Agent, or Firm*—Harness, Dickey & Pierce

[57] ABSTRACT

A pipeline safety joint to provide a controlled point of weakness in at least one pipeline, said safety joint comprising a pair of tubular mandrels sized to be securable to a pipe-end of a pipeline, a portion of one mandrel being insertable into a part of the other mandrel thereof, to provide fluid communication between said pipe-ends. A latch mechanism on the portion of one mandrel is engagable with the part of the other mandrel, to hold said mandrel against axial separation. Retaining means on said one mandrel hold the latch mechanism in engagement. At least one seal assembly includes a metal sealing ring positioned to seal between a radially outer and inner substantially cylindrical surfaces on the mandrels. An annular cylinder and a co-operating annular piston formed on one mandrel and on a ring attached to the mandrel, to form a pressure compensation chamber surrounding said portion rings provide a fluid tight seal between said annular piston and cylinder. A fluid passage provides communication between the interior of said one mandrel and the compensation chamber, the seal assembly and the compensation chamber being dimensioned whereby forces produced to separate said mandrels of a pair of fluid pressure within the mandrels are equalized by the pressure compensation chamber. Frangible tubular bolts normally hold the mandrels in interengagement, break when a predetermined stress is applied thereto, the piston and cylinder then moving axially relative to one another to allow limited axial movement between said mandrels, sufficiently to permit the retaining means to move axially to release said latch mechanism. The interior is filled with a waterproof grease or jelly.

11 Claims, 3 Drawing Sheets

PIPELINE SAFETY JOINT

The present invention relates to a pipeline safety joint to provide a controlled point of weakness in at least one pipeline.

There are many situations in which it is advisable to provide a point of weakness in a pipeline, or a bundle of pipelines, so that should some excessive external force act on the pipeline, it will be enabled to break at the point of weakness without causing damage to the installations to which the pipeline is attached. One particular environment in which danger of such an excessive force arises in an undersea oil pipeline connected to an undersea oil well or other similar equipment.

It has been proposed to provide a separable and at least partially pressure balanced safety pipeline connector or joint for this purpose in U.S. Pat. No. 4,059,288. This safety joint is designed with the purpose of providing a pressure balanced weak point, whereby the connector can separate at a predetermined tension load, for example if the pipeline is caught on a ship's anchor and dragged, wherein the pressure prevailing in the pipeline will have as small an effect as possible on the separation. This is achieved by having a housing, one axial end of which is connected to the pipeline and the other axial end is left open, the joint including a pipe extension member having one axial end adapted for connection to the pipeline for transmission of line fluids therethrough and the other axial ends arranged to be telescopically received in the housing in sealed relationship thereto. The housing and extension member are arranged to provide an annular pressure chamber to which the fluid pressure from the pipeline is fed so that the housing and extension members are forced axially towards one another to balance the pressure prevailing in the pipeline. Additionally a shear disk is mounted between the housing and extension member to retain these two parts against relative axial movement. The shear disk is, however, designed to rupture at a predetermined load such that axial separation is prevented below that level and is permitted above that level.

While such a construction is satisfactory in theory, it has never proved fully satisfactory in practice because it has never been possible to overcome the problems of hydrostatic pressure prevailing at the bottom of the sea or fully to balance the loads caused by the oil pressure on the pipeline.

It is now proposed, according to the invention to provide a pipeline safety joint to provide a controlled point of weakness in at least one pipeline, said safety joint comprising at least one pair of tubular mandrels, each mandrel of a pair being sized to be securable to a pipe-end of a pipeline, a portion of one mandrel of said at least one pair being insertable into a part of the other mandrel thereof, to provide fluid communication between said pipe-ends, a latch mechanism on said portion of said at least one pair engagable with said part of the other mandrel thereof, effective to hold said mandrel against axial separation, retaining means on said one mandrel of said at least one pair retaining said latch mechanism in engagement, at least one seal assembly including a metal saling ring positioned to seal between a radially outer substantially cylindrical surface on one of said tubular mandrels and a radially inner substantially cylindrical surface on the other of said mandrels, an annular cylinder and a co-operating annular piston formed, or engagable directly or indirectly, on one of said mandrels and on the other of said mandrels respectively to form a pressure compensation chamber surrounding said portion of one mandrel of said at least one pair, metal piston rings providing a fluid tight seal between said annular piston and its associated annular cylinder, fluid passage means providing communication between the interior of said at least one mandrel and its associated pressure compensation chamber, said at least one seal assembly and its associated pressure compensation chamber being dimensioned whereby forces produced to separate said mandrels of a pair by fluid pressure within said mandrels are equalised by said pressure compensation chamber and, frangible securing means normally holding said mandrels of said at least one pair in interengagement, but breaking when a predetermined stress is applied thereto, said annular piston being axially movable relative to said annular cylinder when said frangible securing means break, thereby initially allowing limited axial movement between said mandrels of said at least one pair, sufficiently to permit said retaining means to move axially to release said latch mechanism, thereby to allow the mandrels of said at least one pair to disengage from one another.

Because of the construction of the seal assembly of such a safety joint, once it has been assembled and before fluid is passed through the pipes joined thereby, there is substantially no axial loading on the frangible securing means, e.g. fracture bolts, so they can accurately be designed to fracture at the desired predetermined force.

With the construction as set forth above, because the compensation chamber is rendered substantially fluid-tight by the metal piston rings, it is unaffected by external hydrostatic pressures.

In a presently preferred construction the annular piston and annular cylinder are formed by an annular step on said portion of said one mandrel and a co-operating overlapping stepped ring connected to said latch mechanism, said annular step having inner and outer substantially cylindrical surfaces co-operating with inner and outer substantially cylindrical surfaces on said stepped ring.

The piston rings advantageously comprise a nickel alloy o-ring or c-ring and the annular inner and outer substantially cylindrical surfaces are formed on nickel alloy annular inserts. The seal assembly is preferably similarly formed.

In a particularly preferred embodiment, the latch means comprises an annular collet secured to said second nd wall, a plurality of axially extending collet arms secured to said annular collet at circumferentially spaced locations, enlarged heads on the ends of said collet arms remote from said annular collet and an annular locking surface engagable by said enlarged heads.

Advantageously said retaining means comprises a shoulder on said one mandrel of said at least one pair engagable by the inner surface of said enlarged heads to retain the outer surface thereof in abutment with said annular locking surface, and an annular groove adjacent said shoulder whereby, when said limited axial movement occurs, said annular groove is positioned radially inwardly of said enlarged heads.

A generally cylindrical extension may be provided completely to surround the compensation chamber and the latch means and a lock-out assembly can be associated with this to prevent any axial movement between the portion of one mandrel and the part of the other mandrel whereby the joint can be assembled at the surface and lowered to the sea-bed without there being any fear of it accidentally rupturing due to this operation.

The sleeve may be moved axially manually, for example, or by the use of a small explosive charge or by applying hydraulic pressure to the interior of the shell. This hydraulic pressure can be provided through a flexible hydraulic line assembled at the surface so that the whole joint can be mounted without the need to use divers.

The invention also contemplates providing any pipeline safety joint of this general type in which the whole interior of said safety joint, except said pressure compensation chamber, is filled with a water resistant grease or jelly under pressure and said interior is communicable with the exterior of said safety joint. With such a concept, should there be any weeping of the seal assembly between the two mandrels over an extended period, the oil will leak slowly into the grease or jelly. The high pipeline pressure will be partly counterbalanced by the hydrostatic water pressure of the surrounding sea, but there will be a resulting slight leakage of the grease or jelly from the joint. However, the leakage will be very small and will not be environmentally harmful.

Figure 1B:
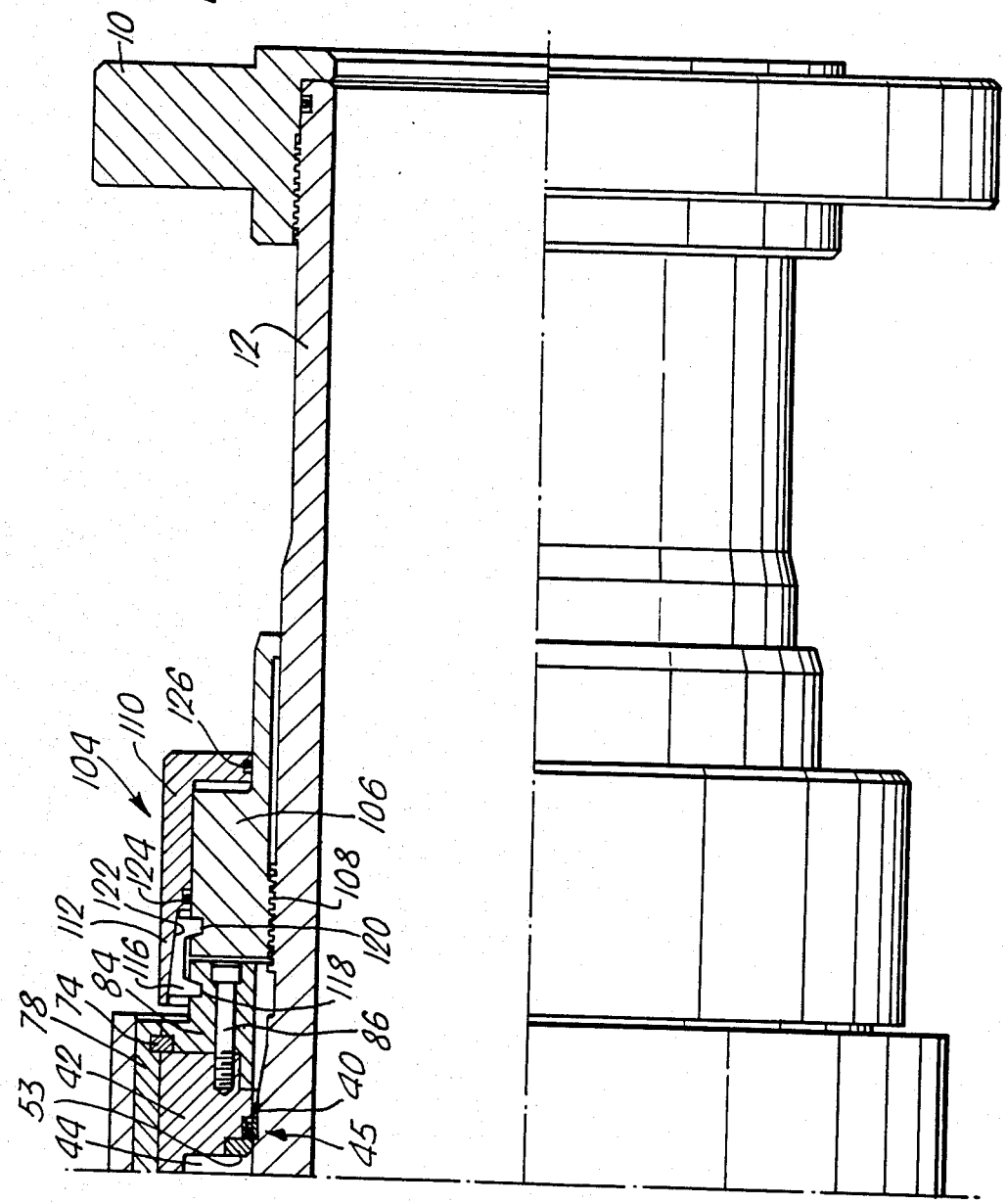
Figure 2:
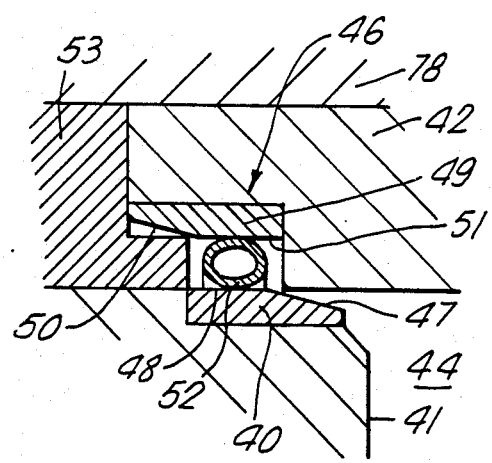
Figure 3:
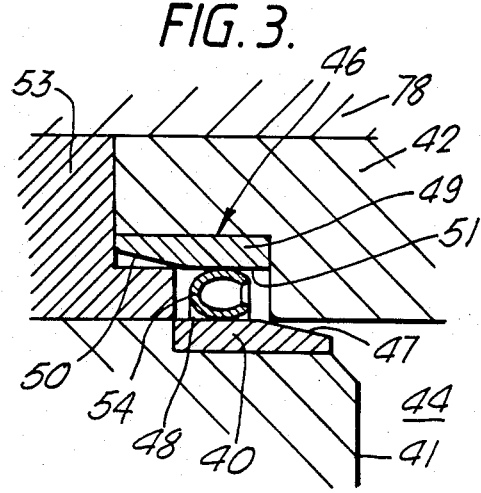

In order that the invention may more fully be understood the following detailed description of one embodiment of pipeline safety joint according to the invention is given below, reference being made to the accompanying drawings, in which:

FIGS. 1A and 1B are two parts of a single half section through said one preferred embodiment of joint according to the invention; and FIGS. 2 and 3 are enlarged cross-sections of two examples of the piston ring assemblies which may be used in the safety joint of FIGS. 1A and 1B.

A pipe-end 10 is shown screwed to a first mandrel 12 provided at its left-hand end with a radial flange 14 having an axial annular projection 16. A second pipe-end 18 having a radial flange 19 is welded at 20 to a second mandrel 22 having a radial flange 24 which is provided with a cylindrical extension 26. The flanges 14 and 24 are each provided with flat abutting surfaces 28, 30, respectively, and with overlapping seal retaining rings 32, 34 into which may be fitted a metal seal ring assembly 36.

The first mandrel 12 includes a cylindrical section 38 having an outer cylindrical surface having inset therein a surface of an inner Inconel insert 40. The flange 14 forms a step 41 extending radially outwards from the outer surface of section 38. A co-axial annular stepped ring 42 defines, with said section 38, a pressure compensation chamber 44. The stepped ring 42 is capable of axial movement and is sealed to surface 38 by a piston ring assembly 45 and to the outer surface of flange 14 by a piston ring assembly 46.

The assembly 46, which is substantially identical to assembly 45 is shown in greater detail in FIG. 2. A radially inner insert 40 of nickel alloy has a chamfered end 47 and a cylindrical portion 48. Similarly a radially outer insert 49 has a chamfered end 50 and a cylindrical portion 51. The chamfered end 47 is used to facilitate the sliding on of a nickel alloy o-ring 52 and the chamfered end 50 to facilitate the sliding on of the ring 42. As this latter is done, the ring compresses radially about 20% and thus deformation is shown by flattening the o-ring. Retaining rings 53 are used to mount the seal assemblies 48 and 46 on the ring 42. As an alternative to an o-ring 52, a c-ring seal 54 can be used—see FIG. 3.

The ring 42 and stepped, cylindrical portion 38 of the mandrel 12, thus form the fluid compensation chamber 44, which communicates with the interior of the mandrel 12 via a passage 55.

Welded at 61 the extension 26 is a cylindrical shroud 62.

Adjacent the left end of the flange 14 of the mandrel 12 is a cylindrical retaining shoulder 70, having an annular space 71 surrounding its left most portion. Secured by a segmented circlip 74 to the ring 42 is an annular collet 78, which is provided with axially extending spaced arms 76 having enlarged heads 80, the inner surfaces of which engage the retaining shoulder 70 and the outer surfaces of which engage an annular inclined locking surface 81 formed on the extension 26. The outer surface of collet 78 is closely adjacent inner surface of shroud 62. The segmented circlip 74 located in a groove formed between ring 42 and a locking ring 84 the left-hand end of which is brought up to abut the ring 42, to which it is secured by bolts 86.

The collet 78, with its arms 76 and enlarged heads 80 co-operate with the locking surface 82 to form a latch means.

The seal assembly 32 is of similar construction to the piston ring assembly of FIG. 2 or FIG. 3.

The mandrels 12 and 2 are held together by frangible fracture bolts 94 threaded into apertures 96 in the flange 14 and passing through co-operating apertures in the flange 24. The fracture bolts 94 are threaded at their right end as seen in the drawing, and are include a tubular shank 96 of nickel alloy, and a hexagan socket or screwdriver slot 98 to enable them to be tightened. A sealing plug (not shown) may also be threaded into each aperture formed in the flange 24.

At the right-hand end, as seen in the drawing, a lock-out assembly 104 is associated with the pipeline safety joint of the invention. This includes a holding ring 106 threadably engaged at 108 to the first mandrel 12 and provided with a sleeve 110 having an overhanging outer skirt 112.

Part annular segments 116 have parts engaging a first shoulder 118 on the locking ring 84 and a second shoulder 120 on the holding ring 106.

The skirt 112 has an inclined inner surface 122 engaging the similarly indirect outer surfaces of the part annular segments 116 to hold them in place. The sleeve 110 also includes o-ring seals 124, 126, sealingly engaged on parts of holding ring 106. A hydraulic line may be connected to the interior of sleeve 110, so that when hydraulic fluid is applied under pressure, the sleeve 110 will be moved to the right thereby to release the segments 116.

The space 90 and the collet arms and heads is not fully sealed from the exterior and this space can be filled with a water repellant grease or jelly, such as a silicon rubber potting compound or silicon gel. Since the space is not sealed, the gel will be a pressure substantially equal to the hydraulic pressure expected to be experienced by the safety joint on the sea bed. The gel will provide a high degree of corrosion protection to the interior of the device.

In use, the above described and disclosed construction is assembled at the surface, as shown, by welding the pipe-end 18 to the second mandrel 22.

The ring 34, seal assembly 36 and ring 32 are positioned and seal welded at the base of the body 22 and mandrel 12 as shown. The collet 78 is moved to the position shown so that the enlarged heads 80 of the arms 76 are engaged in the surface 82. The piston ring assembly 45, 46 are located and the ring 42 slid onto the mandrel 12 which is then fed into exterior 62. A feature of this design is that the primary seal, being trapped between annular surfaces, and the device being compensated, requires only a nominally small load (to take up clearances) to be exerted by tension bolts 94.

The sealing assembly 36 and the mandrel 12 and its associated parts are finally located in position, so that the sealing assembly 36 is engaged against the parts 32, 34 and the fracture bolts 94 tightened up to the desired pre-load. Segments 74 are inserted and locking ring 84 bolted to ring 42 by bolts 86.

The holding ring 106 is then screwed on to the mandrel 12, and the segments 116 positioned whereafter the sleeve 110 is inserted in place, after providing the various sealing rings 124, 126. The thus formed lock-out assembly 104, thus connects mandrel 22 to mandrel 12 via the collet 78 so that the tension bolts 94 are isolated from accidental loads possible during installation of the device.

The flange 10 of the first pipe-end can then be screwed onto the first mandrel 12 and the whole assembly can thereafter be lowered to the bottom of the sea, the lock-out assembly 104 preventing any relative movement of the parts. When at the bottom of the sea and in the correct position, the sleeve 110 can be moved to the right, so that the segments 116 can fall off thereby to activate the safety joint of the invention.

When oil or other fluid is pumped or passed through the pipeline, the tendency would normally be to blow the two surfaces 28, 30 apart to uncouple the whole assembly. However, fluid pressure is fed via fluid passage 55 to the compensation chamber the size of which is chosen, relative to the size of the sealing assembly 36, fully to balance the forces. Part of the force is taken via the ring 42 and the collet 78 to the enlarged head 80 engaging the surface 82. This, in essence, prevents the ring 42 from moving to the right relative to the flange 24. The pressure on the step 41, on the other hand, forces the flange 14 of the first mandrel 12 to the left to equalise the forces.

Since no provision is made to seal the space 90, which is filled with silicon gel, from the external sea water, the pressure in space 90 will be equal to the exterior hydrostatic pressure, which will be, say, for example, 300 psi (22 bar).

The pipeline pressure is likely to be of the order of 2000 psi (136 bar). Should the seal assembly 36 weep then some of the oil will escape into the interior and will force an equal amount of grease or jelly out, and the pressure in the space 90 will remain essentially equal to the external hydrostatic pressure.

Should a ship's anchor, or the like, accidentally foul the pipeline at any place, then the joint of the invention will tend to be stretched and this will cause the tension bolts 94 to fracture and initially this will allow the flange 14, together with the remaining parts of the first mandrel 12 to move to the right slightly. The rightward movement would normally be precluded by the collet mechanism but there will be movement of the flange 14 to reduce the size of chamber 44. This will also cause movement of the retaining shoulder 70 formed integrally with the flange 14, such as to enable the enlarged heads 80 to be positioned outwardly of the annular space 71 beyond the end of the shoulder 70. Because of the chamfered surfaces of the heads 80 and the co-operating locking surface 82, the collet heads 80 will move radially inwardly into said space 71 and become disengaged from the locking surface, thereafter allowing the whole first mandrel assembly to move to the right and the joint will thus break.

I claim:

1. A pipeline safety joint to provide a controlled point of weakness in at least one pipeline, said safety joint comprising at least one pair of tubular mandrels, each mandrel of a pair being sized to be securable to a pipe-end of a pipeline, a portion of one mandrel of said at least one pair inserted into a part of the other mandrel thereof, to provide fluid communication between said pipe-ends, a radially outer substantially cylindrical surface formed on one of said tubular mandrels and a radially inner substantially cylindrical surface formed on the other of said tubular mandrels, a latch mechanism on said portion of said at least one pair engageable with said part of the other mandrel thereof, effective to hold said mandrel against axial separation, retaining means on said one mandrel of said at least one pair retaining said latch mechanism in engagement, at least one seal assembly including a metal sealing ring positioned to seal between said radially outer substantially cylindrical surface on one of said tubular mandrels and said radially inner substantially cylindrical surface on the other of said mandrels, an annular cylinder and a co-operating annular piston formed, or engagable directly or indirectly, on one of said mandrels and on the other of said mandrels respectively to form a pressure compensation chamber surrounding said portion of one mandrel of said at least one pair, metal piston rings providing a fluid tight seal between said annular piston and its associated annular cylinder, fluid passage means providing communication between the interior of said at least one mandrel and its associated pressure compensation chamber, said at least one assembly and its associated pressure compensation chamber being dimensioned whereby forces produced to separate said mandrels of a pair of fluid pressure within said mandrels are equalised by said pressure compensation chamber and, frangible securing means normally holding said mandrels of said at least one pair in interengagement, but breaking when a predetermined stress is applied thereto, said annular piston being axially movable relative to said annular cylinder when said frangible securing means break, thereby initially allowing limited axial movement between said mandrels of said at least one pair, sufficiently to permit said retaining means to move axially to release said latch mechanism, thereby to allow the mandrels of said at least one pair to disengage from one another.

2. A pipeline safety joint as claimed in claim 1, wherein said annular piston and annular cylinder are formed by an annular step on said portion of said one mandrel and a co-operating overlapping stepped ring connected to said latch mechanism, and further comprising inner and outer substantially cylindrical surfaces on said annular step co-operating with inner and outer substantially cylindrical surfaces on said stepped ring.

3. A pipeline safety joint as claimed in claim 1, wherein said piston rings comprise a nickel alloy o-ring or c-ring and the annular inner and outer substantially cylindrical surfaces are formed on nickel alloy annular inserts.

4. A pipeline safety joint as claimed in claim 2, wherein said latch means comprises an annular collet secured to said stepped ring, a plurality of axially extending collet arms secured to said annular collet at circumferentially spaced locations, enlarged heads on the ends of said collet arms remote from said annular collet and an annular locking surface engagable by said enlarged heads.

5. A pipeline safety joint as claimed in claim 4, wherein said retaining means comprise a shoulder on said one mandrel of said at least one pair engagable by the inner surface of said enlarged heads to retain the outer surface thereof in abutment with said annular locking surface, and an annular space adjacent said shoulder, whereby, when said limited axial movement occurs, said annular space is positioned radially inwardly of said enlarged heads.

6. A pipeline safety joint as claimed in claim 1, wherein said part of said other mandrel comprises a generally cylindrical extension completely surrounding said compensation chamber and said latch means.

7. A pipeline safety joint as claimed in claim 6, and further comprising a lock-out assembly preventing any axial movement between said portion of said one mandrel and said part of the other mandrel.

8. A pipeline safety joint as claimed in claim 7, wherein said lock-out mechanism comprises a holding ring threadably engaged with said portion of said mandrel of said at least one pair, a first annular shoulder formed on said extension adjacent the free end thereof or on a member secured to said extension, a second annular shoulder formed on said holding ring, a plurality of part annular shells mountable around said shoulders to hold said shoulders together, a sleeve surrounding said holding ring and said shells, to hold said shells in position and means to allow said sleeve to move axially relative to said holding ring thereby to release said shells and de-activate said lock-out mechanism.

9. A pipeline safety joint as claimed in claim 8, wherein said first annular shoulder is formed on an annular member secured to said latch mechanism.

10. A pipeline safety joint as claimed in claim 1, wherein the whole interior of said safety joint, except said pressure compensation chamber, is filled with a water resistant grease or jelly under pressure and said interior is communicable with the exterior of said safety joint.

11. A pipeline safety joint as claimed in claim 1, wherein said frangible securing means comprise a plurality of circumferentially spaced, nickel alloy bolts, each having a tubular shank, the cross-section of which is chosen to enable said bolts to break under a predetermined externally applied axial load.

* * * * *